US011623455B2

(12) United States Patent
Abe et al.

(10) Patent No.: US 11,623,455 B2
(45) Date of Patent: Apr. 11, 2023

(54) LIQUID DISCHARGE APPARATUS AND LIQUID DISCHARGE METHOD

(71) Applicants: Kimito Abe, Kanagawa (JP); Shotaro Takeuchi, Kanagawa (JP); Masanori Hirano, Kanagawa (JP); Takayuki Ito, Kanagawa (JP); Takahiko Sugiura, Kanagawa (JP); Daiki Marumo, Kanagawa (JP); Kyohei Hamada, Kanagawa (JP)

(72) Inventors: Kimito Abe, Kanagawa (JP); Shotaro Takeuchi, Kanagawa (JP); Masanori Hirano, Kanagawa (JP); Takayuki Ito, Kanagawa (JP); Takahiko Sugiura, Kanagawa (JP); Daiki Marumo, Kanagawa (JP); Kyohei Hamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 17/494,988

(22) Filed: Oct. 6, 2021

(65) Prior Publication Data
US 2022/0111659 A1    Apr. 14, 2022

(30) Foreign Application Priority Data

Oct. 9, 2020    (JP) .............................. JP2020-171453

(51) Int. Cl.
*G06K 15/10*    (2006.01)
*B41J 2/21*    (2006.01)
(52) U.S. Cl.
CPC .......... *B41J 2/2132* (2013.01); *G06K 15/107* (2013.01)

(58) Field of Classification Search
CPC .................................................... G06K 15/107
See application file for complete search history.

(56) References Cited

U.S. PATENT DOCUMENTS

| 2005/0200900 | A1 | 9/2005 | Hirano |
| 2005/0231742 | A1 | 10/2005 | Hirano |
| 2007/0091135 | A1 | 4/2007 | Hosaka et al. |
| 2009/0080002 | A1 | 3/2009 | Nakano et al. |
| 2010/0231631 | A1 | 9/2010 | Hosaka et al. |
| 2011/0090276 | A1 | 4/2011 | Hirano |
| 2011/0102489 | A1 | 5/2011 | Sakakibara et al. |
| 2012/0147078 | A1 | 6/2012 | Takagi et al. |

(Continued)

FOREIGN PATENT DOCUMENTS

| JP | 2010-162772 | 7/2010 |
| JP | 2011-121248 | 6/2011 |
| JP | 2011-121249 | 6/2011 |

*Primary Examiner* — Julian D Huffman
(74) *Attorney, Agent, or Firm* — Duft & Bornsen, PC

(57) ABSTRACT

A liquid discharge apparatus includes a color component divided data generation unit, a dot data generation processing unit, and a dot data segmentation processing unit. The color component divided data generation unit generates color component divided data from image data. The dot data generation processing unit applies a dot data generation mask to the color component divided data to generate dot data. The dot data segmentation processing unit applies a segmentation mask to the dot data to generate scan data. A width of the segmentation mask in a main scanning direction is different from a width of the dot data generation mask in the main scanning direction.

6 Claims, 13 Drawing Sheets

(56) References Cited

U.S. PATENT DOCUMENTS

| | | |
|---|---|---|
| 2012/0147082 A1 | 6/2012 | Takagi et al. |
| 2013/0057879 A1 | 3/2013 | Takagi et al. |
| 2013/0194333 A1 | 8/2013 | Ito et al. |
| 2014/0347415 A1 | 11/2014 | Ito et al. |
| 2015/0306891 A1 | 10/2015 | Sohgawa et al. |
| 2017/0157921 A1 | 6/2017 | Tashiro et al. |
| 2018/0144218 A1 | 5/2018 | Hirano et al. |
| 2020/0290343 A1 | 9/2020 | Abe |
| 2021/0178755 A1 | 6/2021 | Abe |
| 2022/0203678 A1* | 6/2022 | Kobayashi ........... B41J 2/04581 |

* cited by examiner

GENERATED DOT PATTERN

IN CASE OF IMAGE WHOSE COLOR IS UNIFORM, SAME DOT PATTERN IS REPEATED FOR EACH SIZE OF MASK

COLOR COMPONENT DIVIDED DATA (8-BIT)

| 128 | 128 | 128 | 128 | 128 | 128 | 128 | 128 |
|---|---|---|---|---|---|---|---|
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

DOT DATA GENERATION MASK

DOT DATA GENERATION MASK

| 0 | 128 | 32 | 160 |
|---|---|---|---|
| 192 | 64 | 224 | 96 |
| 48 | 176 | 16 | 144 |
| 240 | 112 | 208 | 80 |

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2020-171453, filed on Oct. 9, 2020, in the Japan Patent Office, the entire disclosure of which is hereby incorporated by reference herein.

TECHNICAL FIELD

Embodiments of the present disclosure relate to a liquid discharge apparatus and a liquid discharge method.

RELATED ART

In an inkjet type liquid discharge apparatus (so-called inkjet recording apparatus), a technique of creating data for each scan using a plurality of segmentation masks for dot data after halftone processing in multi-scan printing has been developed. In addition, among serial type inkjet printers that perform multi-scan printing, there is a wide industrial printer having a printing width of several meters. In such a large printer, since the size of data to be processed is enormous, a technique has been developed in which dot data creation processing by halftone processing is performed by dithering using a mask with a high calculation speed.

SUMMARY

According to an embodiment of the present disclosure, a liquid discharge apparatus includes a color component divided data generation unit, a dot data generation processing unit, and a dot data segmentation processing unit. The color component divided data generation unit generates color component divided data from image data. The dot data generation processing unit applies a dot data generation mask to the color component divided data to generate dot data. The dot data segmentation processing unit applies a segmentation mask to the dot data to generate scan data. A width of the segmentation mask in a main scanning direction is different from a width of the dot data generation mask in the main scanning direction.

According to another embodiment of the present disclosure, there is provided a printing method to be executed in a liquid discharge apparatus. The method includes: generating color component divided data from image data; applying a dot data generation mask to the color component divided data to generate dot data; and applying a segmentation mask to the dot data to generate scan data. A width of the segmentation mask in a main scanning direction is different from a width of the dot data generation mask in the main scanning direction.

According to still another embodiment of the present disclosure, a liquid discharge apparatus includes processing circuitry. The processing circuitry generates color component divided data from image data, applies a dot data generation mask to the color component divided data to generate dot data, and applies a segmentation mask to the dot data to generate scan data. A width of the segmentation mask in a main scanning direction is different from a width of the dot data generation mask in the main scanning direction.

BRIEF DESCRIPTIONS OF THE DRAWINGS

A more complete appreciation of the disclosure and many of the attendant advantages and features thereof can be readily obtained and understood from the following detailed description with reference to the accompanying drawings, wherein.

Figure 1:
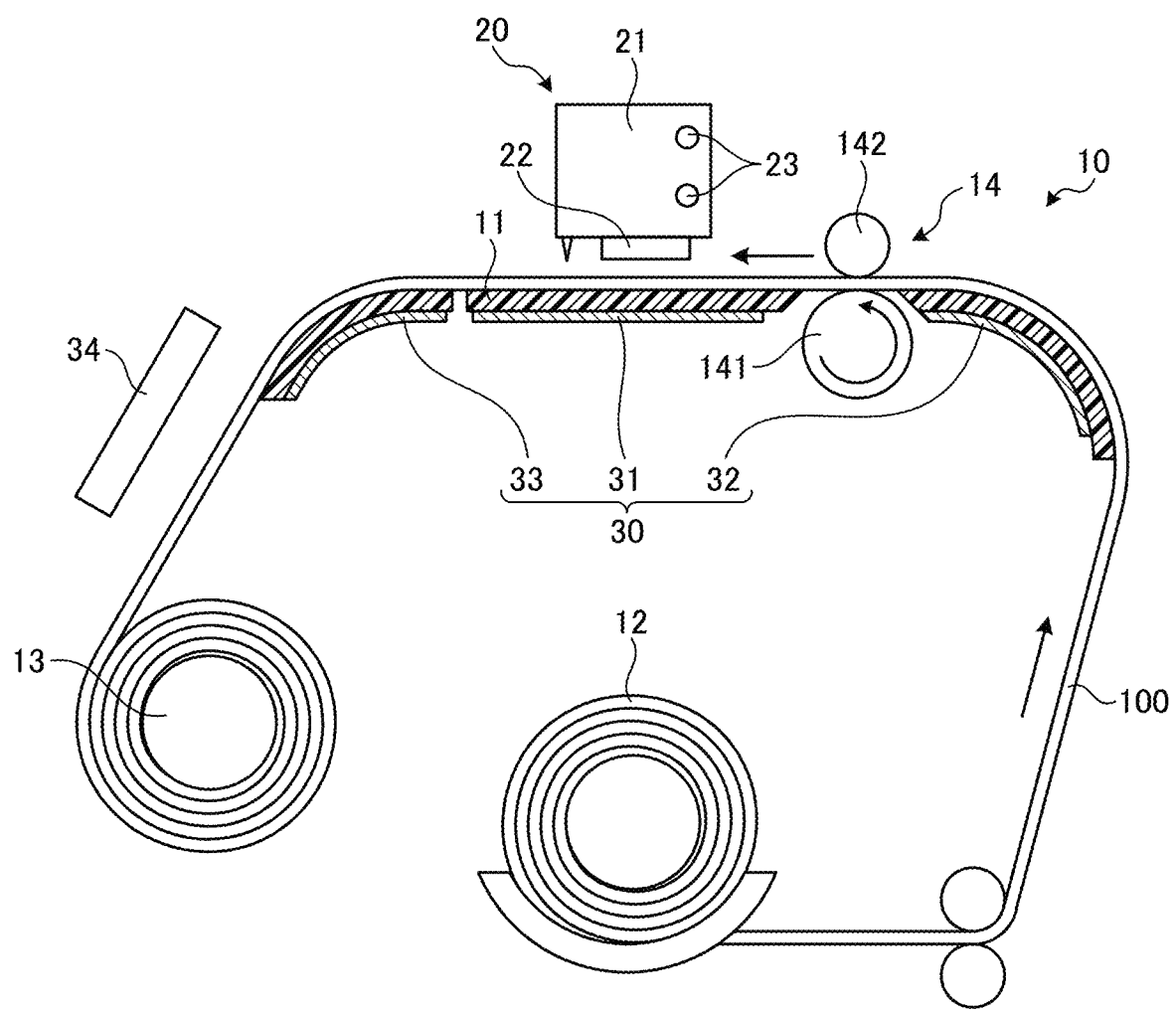
FIG. 1 is a side view illustrating an example of a configuration of an inkjet recording apparatus to which a liquid discharge apparatus according to a present embodiment is applied.

The accompanying drawings are intended to depict embodiments of the present invention and should not be interpreted to limit the scope thereof. The accompanying drawings are not to be considered as drawn to scale unless explicitly noted.

DETAILED DESCRIPTIONS OF EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of a liquid discharge apparatus and a liquid discharge method will be described in detail with reference to the accompanying drawings.

Figure 2:
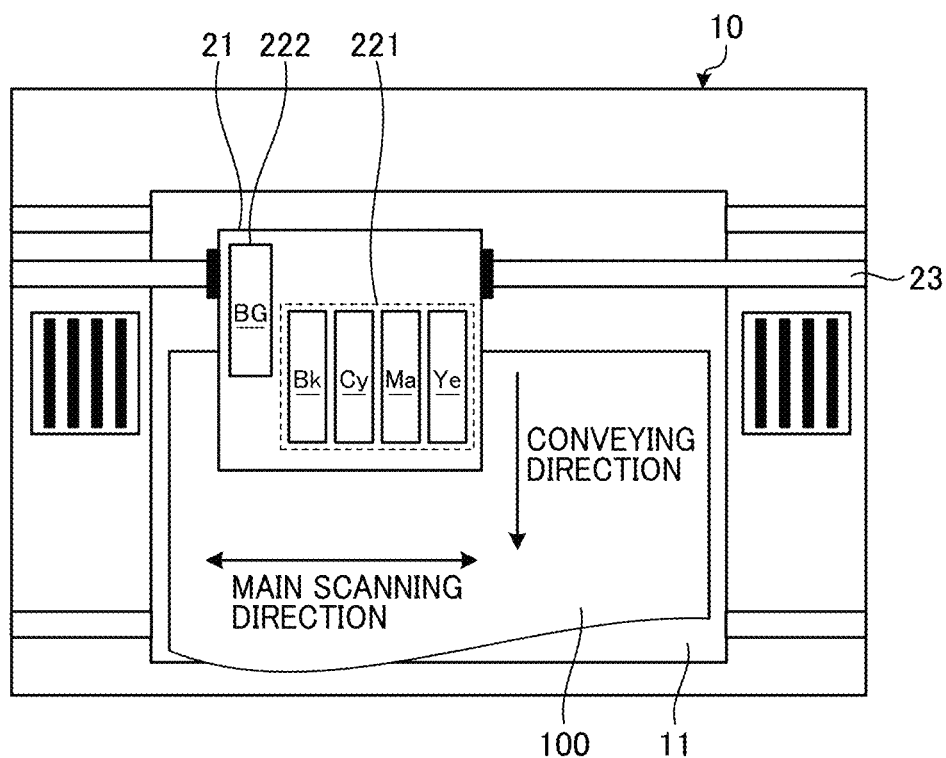
FIG. 2 is a top view schematically illustrating an example of a configuration of a carriage included in the inkjet recording apparatus according to a present embodiment.
Figure 3:
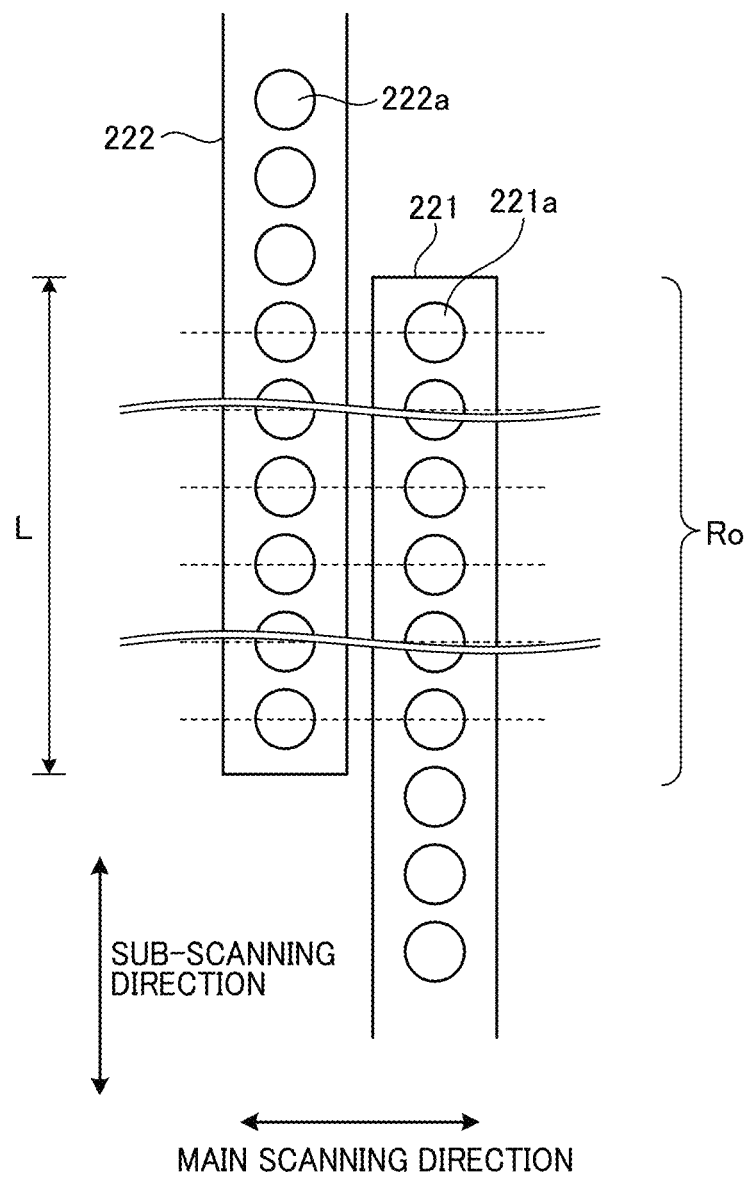
FIG. 3 is a plan view illustrating an example of arrangement of nozzles in a recording head included in the inkjet recording apparatus according to a present embodiment.

FIG. 1 is a side view illustrating an example of a configuration of an inkjet recording apparatus to which a liquid discharge apparatus according to this embodiment is applied. FIG. 2 is a top view schematically illustrating an example of a configuration of a carriage included in the inkjet recording apparatus according to this embodiment. FIG. 3 is a plan view illustrating an example of arrangement of nozzles in a recording head included in the inkjet recording apparatus according to this embodiment. In this example, a serial type inkjet recording apparatus is taken as an example of the inkjet recording apparatus. The inkjet recording apparatus 10 according to this embodiment includes a platen 11, a roll medium container 12, a winding roll 13, a conveyance unit 14, and an image forming unit 20 inside a main body.

The platen 11 supports a medium 100 from the non-recording surface side at the time of liquid discharge. The roll medium container 12 is a sheet feeding unit, and a wound medium (discharge target object) 100 is set therein. The medium 100 having a different size in the width direction can be set in the roll medium container 12. The winding roll 13 is a sheet ejection unit and winds and collects the medium 100 on which an image is formed. The platen 11, the roll medium container 12, and the winding roll 13 are arranged such that the medium 100 reaches the winding roll 13 from the roll medium container 12 via the platen 11.

The conveyance unit 14 is a member having a function of conveying the medium 100 in the conveying direction. In this example, the conveyance unit 14 includes a feed roller 141 disposed below the platen 11 with the platen 11 interposed therebetween and a roller 142 disposed above the platen 11. The medium 100 is sandwiched between the feed roller 141 and the roller 142. The conveyance unit 14 rotates the feed roller 141 forward (in a direction indicated by arrow in FIG. 1) to convey the medium 100 loaded onto the platen 11 forward on the platen 11.

The image forming unit 20 is disposed in a region facing the platen 11. The image forming unit 20 includes a carriage 21. A recording head 22 is provided on a surface of the carriage 21 on the platen 11 side. The recording head 22 is a liquid discharge head including a nozzle row in which nozzle holes, which are a plurality of discharge ports for discharging liquid, are arranged. In this embodiment, the recording head 22 includes a color ink discharge head 221 (first head) including a first nozzle row that discharges color ink (first liquid) and a background ink discharge head 222 (second head) including a second nozzle row that discharges background ink (second liquid).

As illustrated in FIG. 2, in the inkjet recording apparatus 10 according to this embodiment, a part of the background ink discharge head 222 is arranged so as to overlap the arrangement position of the color ink discharge head 221 in the main scanning direction which is the first direction. That is, the background ink discharge head 222 is arranged to be shifted to the upstream side in the conveying direction of the medium 100 with respect to the arrangement position of the color ink discharge head 221 in the sub-scanning direction which is the second direction. Here, the main scanning direction is a direction in which the carriage 21 is moved and is a direction perpendicular to the conveying direction of the medium 100. The sub-scanning direction is a direction perpendicular to the main scanning direction and is a direction parallel to the conveying direction of the medium 100. With reference to the platen 11, a side on which the roll medium container 12 is arranged is defined as an upstream side, and a side on which the winding roll 13 is arranged is defined as a downstream side. That is, the arrangement of the discharge head illustrated in FIG. 2 is an arrangement for front printing. As will be described later, one in which the background ink discharge head 222 is arranged to be shifted to the downstream side in the conveying direction of the medium 100 with respect to the arrangement position of the color ink discharge head 221 in the sub-scanning direction is for back printing.

The carriage 21 is slidably held by a guide shaft 23 extending in the scanning direction. The carriage 21 is moved (main scanning) along the guide shaft 23 by a main scanning motor. A sensor that optically detects the end of the medium 100 is attached to the carriage 21. The position of the end of the medium 100 in the main scanning direction and the width of the medium 100 are calculated by detecting the end of the medium 100 as the carriage 21 moves. In the main scanning region of the carriage 21, the medium 100 is intermittently conveyed in the sub-scanning direction in the recording region where printing is performed.

The carriage 21 includes a sub tank and replenishes and supplies ink, which is liquid, from a main tank to each discharge head. Instead of this configuration, an ink cartridge that supplies liquid to each discharge head may be detachably included in the carriage 21.

In the example of FIG. 2, as the color ink discharge head 221, four liquid discharge heads that discharge ink droplets of respective colors of yellow (Y), magenta (M), cyan (C), and black (K) are provided. The background ink discharge head 222 is provided with one liquid discharge head that discharges ink droplets of a background color such as white, silver, or the like.

As illustrated in FIG. 3, the color ink discharge head 221 and the background ink discharge head 222 include a plurality of nozzles 221a and 222a that discharges ink. In each discharge head, the nozzles 221a and 222a are arranged along the sub-scanning direction. In addition, in an overlapping region Ro where the color ink discharge head 221 and the background ink discharge head 222 overlap, the color ink discharge head 221 and the background ink discharge head 222 are arranged such that the positions of the nozzles 221a and 222a of the respective discharge heads in the sub-scanning direction coincide with each other. That is, in the overlapping region Ro, the nozzles 221a and 222a of the color ink discharge head 221 and the background ink discharge head 222 are arranged to overlap in the main scanning direction.

The discharging mode of the ink droplets discharged from the color ink discharge head 221 and the background ink discharge head 222 is controlled by a driving pulse applied to a driving element provided corresponding to each of the nozzles 221a and 222a of each discharge head. As the drive element, for example, a piezoelectric element such as lead zirconate titanate (PZT) and the like is used.

The inkjet recording apparatus 10 further includes a medium heater 30 and a hot air fan 34. The medium heater 30 includes a print heater 31, a pre-heater 32, and a post-heater 33. The print heater 31 is provided in an image forming region where the image forming unit 20 is provided and heats the medium 100 on which the ink droplets discharged from the nozzles of the recording head 22 are to be landed. The pre-heater 32 is provided on the upstream side of the print heater 31 in the conveying direction of the medium 100 and preliminarily heats the medium 100. The post-heater 33 is provided on the downstream side of the print heater 31 in the conveying direction of the medium 100 and continuously heats the medium 100 to promote drying of the landed ink droplets. As the print heater 31, the pre-heater 32, and the post-heater 33, an electrothermal heater using a ceramic or nichrome wire is used.

The hot air fan 34 is provided on the downstream side of the post-heater 33 in the conveying direction of the medium 100 and blows hot air to a recording surface of the medium 100 on which the ink has landed. Hot air directly hits the ink on the recording surface by the hot air fan 34. As a result, the humidity of the atmosphere around the recording surface is lowered, and the ink is completely dried before the medium 100 is wound by the winding roll 13.

As described above, the inkjet recording apparatus 10 includes a drying mechanism and can print on a non-permeable medium into which ink, such as vinyl chloride, polyethylene terephthalate (PET), acrylic, or the like, does not soak. For the non-permeable medium, a solvent-based ink or an aqueous resin ink containing a large amount of a resin component is preferable.

In the inkjet recording apparatus 10 in which the carriage 21 discharges ink while reciprocating in the width direction of the medium 100 to form an image, unidirectional printing and bidirectional printing can be performed. Unidirectional printing is a method of forming an image by discharging ink only when the operation of the carriage 21 is the forward path. Bidirectional printing is a method of forming an image by discharging ink when the operation of the carriage 21 is both the forward path and the backward path. Since the printing speed is faster in bidirectional printing than in unidirectional printing, it is desirable to perform printing by bidirectional printing.

Figure 4:
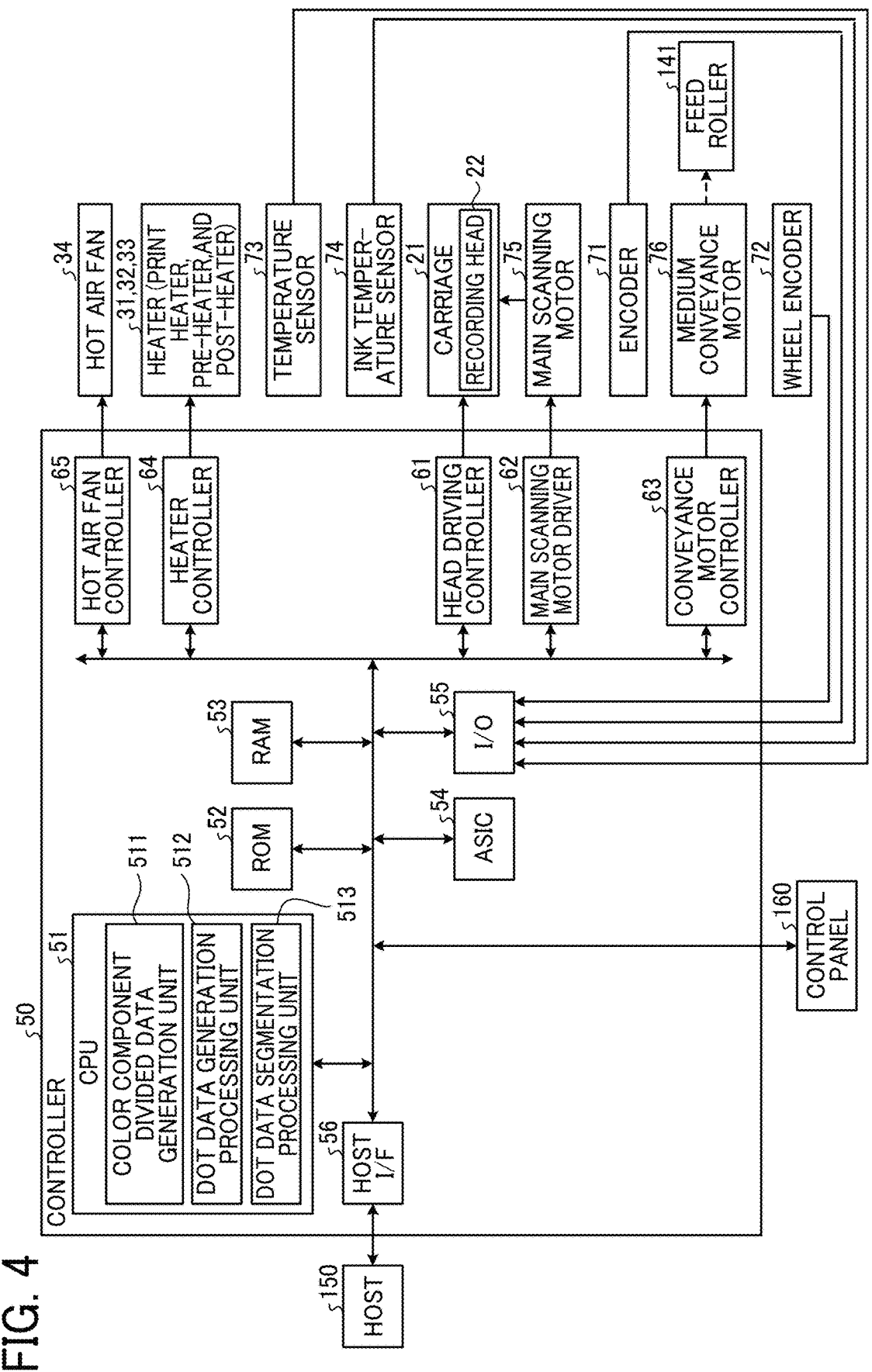
FIG. 4 is a block diagram mainly illustrating an example of a hardware configuration of a controller of the liquid discharge apparatus according to a present embodiment.

FIG. 4 is a block diagram mainly illustrating an example of a hardware configuration of a controller of the liquid discharge apparatus according to this embodiment. The controller 50 includes a central processing unit (CPU) 51, a read-only memory (ROM) 52, a random access memory (RAM) 53, an application-specific integrated circuit (ASIC) 54, and an input/output (I/O) 55.

The CPU 51 controls the whole inkjet recording apparatus 10. The ROM 52 is a rewritable nonvolatile memory for holding data even while the power of the inkjet recording apparatus 10 is off and stores a program executed by the CPU 51 and other fixed data. The RAM 53 temporarily stores image data, print data, or the like. The ASIC 54 processes various signal processing on image data or print data, image processing performing rearrangement and the like, or an input/output signal for controlling the whole inkjet recording apparatus 10. The I/O 55 receives a detection pulse from an encoder 71 and a wheel encoder 72, and a detection signal from a temperature sensor 73, an ink temperature sensor 74, and other various sensors. The temperature sensor 73 measures the temperatures of the print heater 31, the pre-heater 32, and the post-heater 33. The ink temperature sensor 74 is installed in the vicinity of the recording head 22 and detects the temperature of the ink discharged by the recording head 22.

In addition, the controller 50 further includes a host interface (I/F) 56, a head driving controller 61, a main scanning motor driver 62, a conveyance motor controller 63, a heater controller 64, and a hot air fan controller 65. The host I/F 56 transmits and receives data and a signal to and from a host 150 side. Examples of the host 150 include an information processing apparatus such as a personal computer, an image reading apparatus such as an image scanner, an imaging apparatus such as a digital camera, and the like.

The head driving controller 61 includes a data transfer unit to control the driving of the recording head 22. Note that the recording head 22 and the head driving controller 61 constitute a liquid discharge unit. The head driving controller 61 transfers image data (processed data and discharge data) as serial data to a driving circuit inside the recording head 22. In addition, at this time, the head driving controller 61 generates a transfer clock and a latch signal required for transferring image data, confirming the transfer, and the like and a drive waveform to be used when ink (liquid) is discharged from the recording head 22 and inputs the drive waveform to a driving circuit inside the recording head 22. Here, since the viscosity of ink varies depending on the temperature, the head driving controller 61 changes the drive waveform to be generated according to the ink temperature detected by the ink temperature sensor 74. By generating the drive waveform corresponding to ink viscosity by the head driving controller 61, the discharge variation as the viscosity of ink changes is suppressed. The driving circuit selectively inputs a drive waveform corresponding to the input image data to the piezoelectric element (actuator) of each nozzle of the recording head 22.

The main scanning motor driver 62 controls the drive of the main scanning motor under the control of the CPU 51 to control the movement of the carriage 21 in the main scanning direction. A main scanning motor 75 rotationally drives to move the carriage 21 in the main scanning direction via the timing belt. The encoder 71 detects the rotation of the main scanning motor 75 and outputs a detection result to the CPU 51 via the I/O 55.

The conveyance motor controller 63 drives a medium conveyance motor 76. The medium conveyance motor 76 is, for example, a motor that rotates the feed roller 141 of FIG. 1. The conveyance motor controller 63 calculates a control value based on a target value given from the CPU 51 side and an actual value of conveying speed obtained by sampling the detection pulse from the wheel encoder 72. Then, the conveyance motor controller 63 drives the medium conveyance motor 76 via an internal motor driving circuit based on the control value.

The heater controller 64 controls the print heater 31, the pre-heater 32, and the post-heater 33. The heater controller 64 monitors temperatures of the print heater 31, the pre-heater 32, and the post-heater 33 using the temperature sensors 73 provided in the vicinity of the respective heaters. The heater controller 64 controls the print heater 31, the pre-heater 32, and the post-heater 33 based on temperature data acquired from each temperature sensor 73. A heater provided on the head tank and the ink path is similarly controlled. The hot air fan controller 65 controls the hot air fan 34 so as to blow air at a predetermined temperature and a predetermined air volume.

In addition, a control panel 160 that inputs and displays information necessary for the inkjet recording apparatus 10 is connected to the controller 50. The control panel 160 includes, for example, a touch panel or the like.

The outline of the operation in the inkjet recording apparatus 10 having such a configuration will be described. The controller 50 receives print data and the like from the host 150 side via the host I/F 56 via a cable or a network. Then, the CPU 51 reads and analyzes the print data in a receiving buffer included in the host I/F 56. Subsequently, the ASIC 54 performs required image processing, data rearrangement processing, and the like and transfers the processed data (image data) to the recording head 22 via the head driving controller 61. Note that generation of dot pattern data for outputting an image may be performed by storing font data in the ROM 52, for example, or may be performed by developing image data into bitmap data by a printer driver on the host side and transferring the bitmap data to the inkjet recording apparatus 10 side.

Next, an example of a functional configuration of the inkjet recording apparatus 10 according to this embodiment will be described with reference to FIG. 4.

In this embodiment, the CPU 51 uses the RAM 53 as a work area to execute a program stored in the ROM 52, thereby realizing a color component divided data generation unit 511, a dot data generation processing unit 512, and a dot data segmentation processing unit 513 as illustrated in FIG. 4.

The color component divided data generation unit 511 generates color component divided data from the image data. Here, the color component divided data is image data (for example, 8-bit image data (0 to 255)) obtained by component-dividing (dividing) image data into respective colors (for example, CMYK).

The dot data generation processing unit 512 generates dot data (1-bit image data (0 or 1)) by applying a predetermined dot data generation mask to the color component divided data generated by the color component divided data generation unit 511. Here, the predetermined dot data generation mask is a preset mask, for example, a dither mask used for halftone processing.

The dot data segmentation processing unit 513 applies a segmentation mask to the dot data generated by the dot data generation processing unit 512 to generate scan data. Here, the segmentation mask is a preset mask and is a mask having a width in the main scanning direction different from that of the dot data generation mask. As a result, a dot pattern of the scan data can be a random dot pattern. As a result, in a case where deviation of a landing point of liquid occurs when forming an image having a uniform color such as solid, it is possible to suppress occurrence of an unintended pattern periodically in the main scanning direction of the recording head 22. In this embodiment, the dot data generation mask and the segmentation mask are preferably masks having no periodicity. Here, the scan data is print data (dot data) of each scan by the recording head 22.

Figure 5:
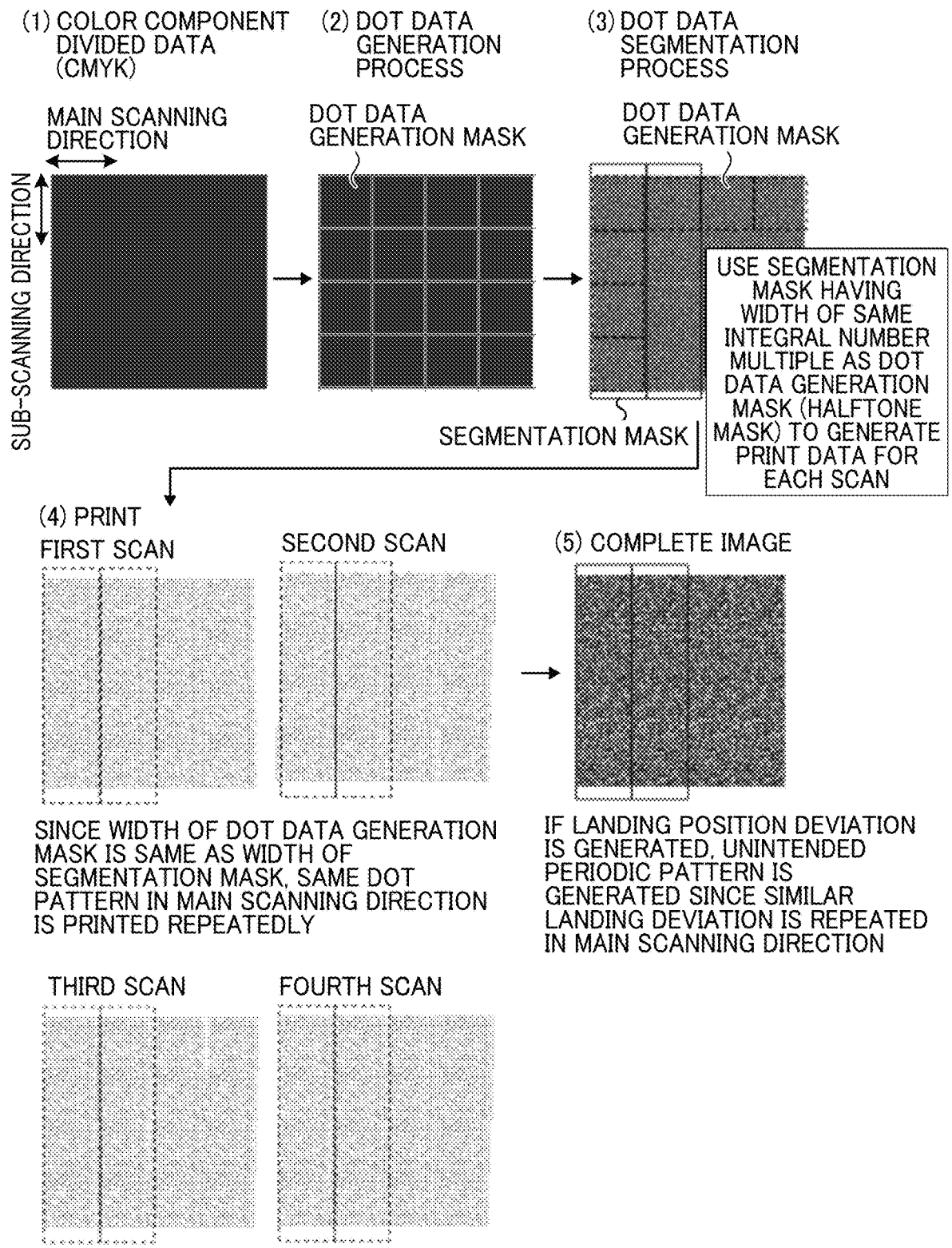
FIG. 5 is a diagram for describing an example of an image printing process in a conventional inkjet recording apparatus.
Figure 6:
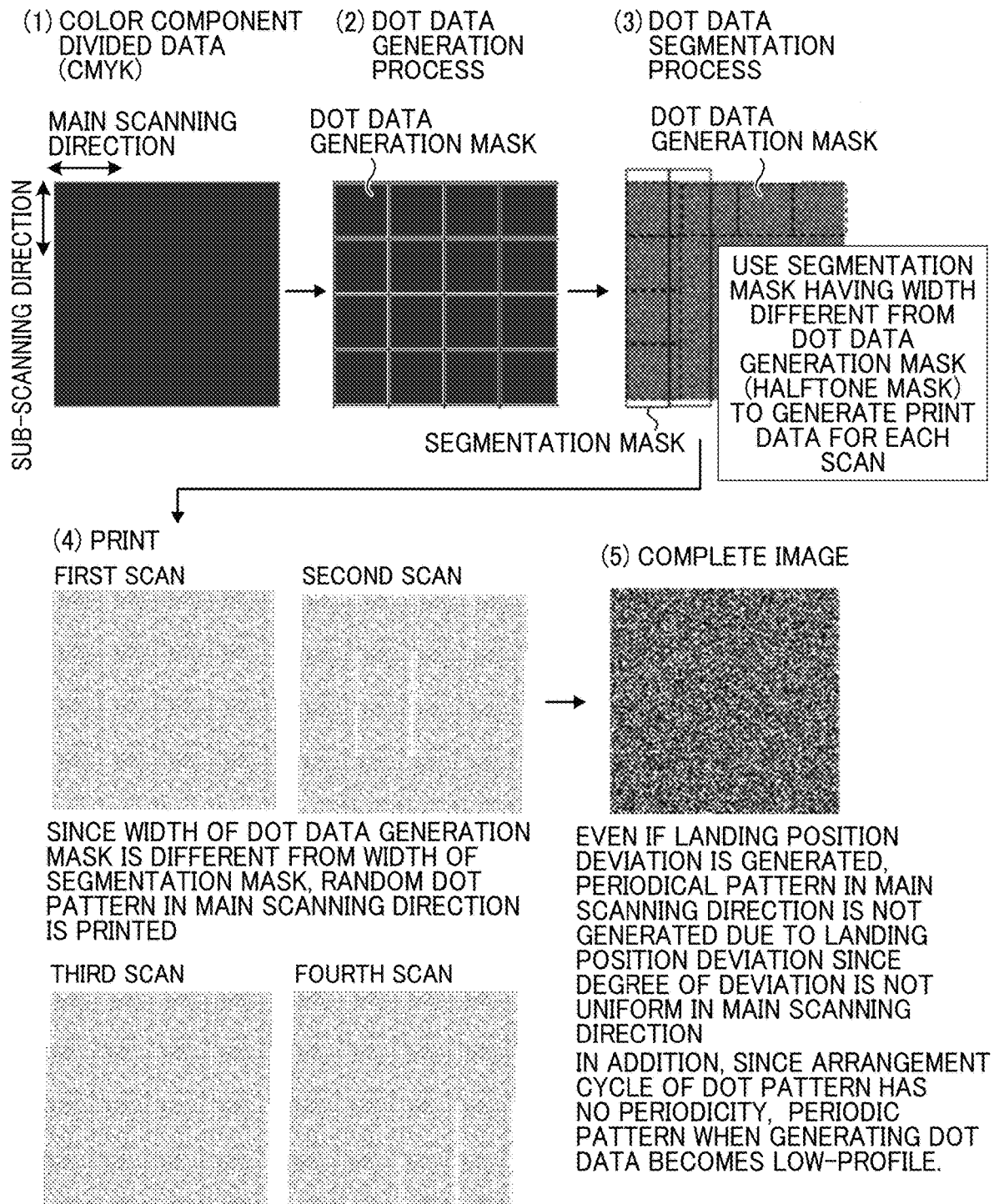
FIG. 6 is a diagram for describing an example of an image printing process in the inkjet recording apparatus according to a present embodiment.

Next, an example of an image printing process in a conventional inkjet recording apparatus will be described with reference to FIGS. 5 and 6. FIG. 5 is a diagram for describing an example of an image printing process in a conventional inkjet recording apparatus. FIG. 6 is a diagram for describing an example of an image printing process in the inkjet recording apparatus according to this embodiment.

In a conventional inkjet recording apparatus, when the width of the dot data generation mask and the width of the segmentation mask in the main scanning direction of the recording head 22 are the same, relative positions of the dot data generation mask and the separate mask on the image are fixed as illustrated in diagrams (1) to (3) of FIG. 5. Therefore, in the conventional inkjet recording apparatus, as illustrated in (4) and (5) of FIG. 5, in a case where printing a solid image, a repeated pattern in which dot patterns of scan data are the same pattern is generated.

Therefore, in the inkjet recording apparatus 10 according to this embodiment, as illustrated in FIG. 6, the width of the dot data generation mask is made different from the width of the segmentation mask in the main scanning direction of the recording head 22. Thus, in the inkjet recording apparatus 10 according to this embodiment, as illustrated in diagrams (1) to (3) of FIG. 6, relative positions of the dot generation mask and the segmentation mask on the image can be varied. As a result, as illustrated in (4) and (5) of FIG. 6, even in a case where printing a solid image, the dot pattern of the scan data can be a random pattern without repeating the same pattern.

Figure 7:
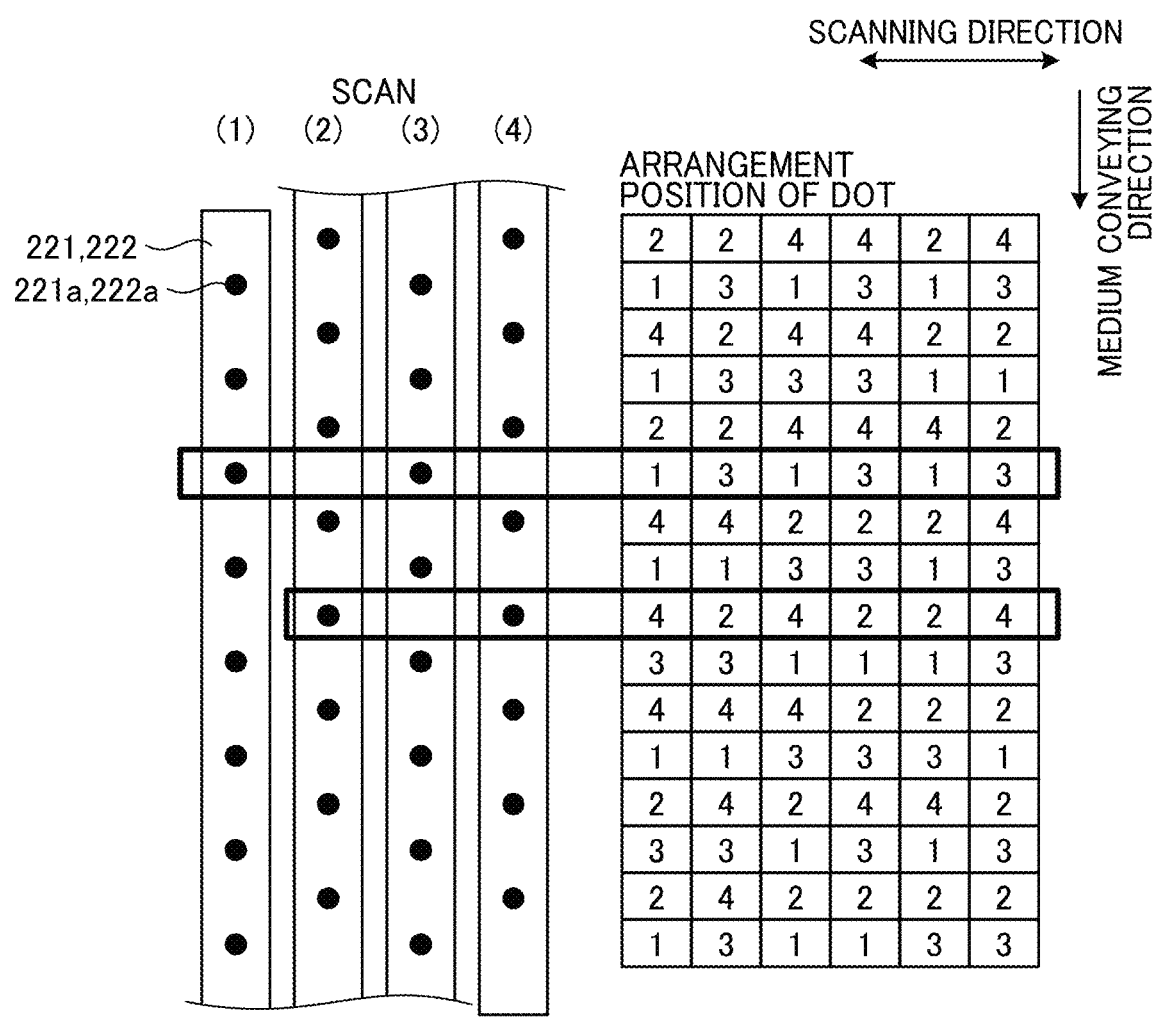
FIG. 7 is a diagram for describing an example of a multi-scan printing process in the inkjet recording apparatus according to a present embodiment.

Next, an example of a multi-scan printing process in the inkjet recording apparatus 10 according to this embodiment will be described with reference to FIG. 7. FIG. 7 is a diagram for describing an example of a multi-scan printing process in the inkjet recording apparatus according to this embodiment.

In the multi-scan printing process, in a serial type inkjet recording apparatus, a dot of scan data is arranged by being divided into a plurality of scans in the main scanning direction of the recording head 22. As a result, it is possible to shift the relative position between the medium 100 and the nozzles 221*a* and 222*a* that discharge liquid each time the recording head 22 scans in the main scanning direction and print an image having a desired resolution on the medium 100.

For example, in a case where executing the multi-scan printing process in the 2-path ½ interlace, the inkjet recording apparatus 10 forms one line on the medium 100 by two scans in the main scanning direction of the recording head 22. That is, the inkjet recording apparatus 10 prints dot data of one line in the main scanning direction by two scans in the main scanning direction of the recording head 22. For example, as illustrated in FIG. 7, the inkjet recording apparatus 10 forms one line in the main scanning direction by each of the first scan and the third scan (indicated by a thick frame) and the second scan and the fourth scan (indicated by a thick frame) in which the positions of the nozzles 221*a* and 222*a* in the sub-scanning direction (medium conveying direction) orthogonal to the main scanning direction (scanning direction) overlap. The dot arrangement positions illustrated in FIG. 7 indicate the arrangement of dots of an image to be formed on the medium 100. In addition, the number described in the dot arrangement position illustrated in FIG. 7 indicates which scan of the recording head 22 in the main scanning direction forms the dot formed at the dot arrangement position.

That is, in the 2-pass ½ interlace, the positions of the nozzles 221*a* and 222*a* in the sub-scanning direction exist on the same scanning line in each of the first scan and the third scan, and the second scan and the fourth scan. Therefore, the inkjet recording apparatus 10 generates scan data obtained by dividing the dot data in accordance with the positions of the nozzles 221*a* and 222*a* in each scan of the recording head 22. Then, the inkjet recording apparatus 10 forms an image on the medium 100 according to the generated scan data.

In this embodiment, in a case where printing an image by ½ interlace, the inkjet recording apparatus 10 conveys the medium 100 so that the relative position between the dot formed on the medium 100 and the nozzles 221*a* and 222*a* is shifted by the output resolution in the sub-scanning direction. As a result, the inkjet recording apparatus 10 can form an image with a desired output resolution in the sub-scanning direction on the medium 100 by two scans of the recording head 22 in the main scanning direction.

Figure 8:
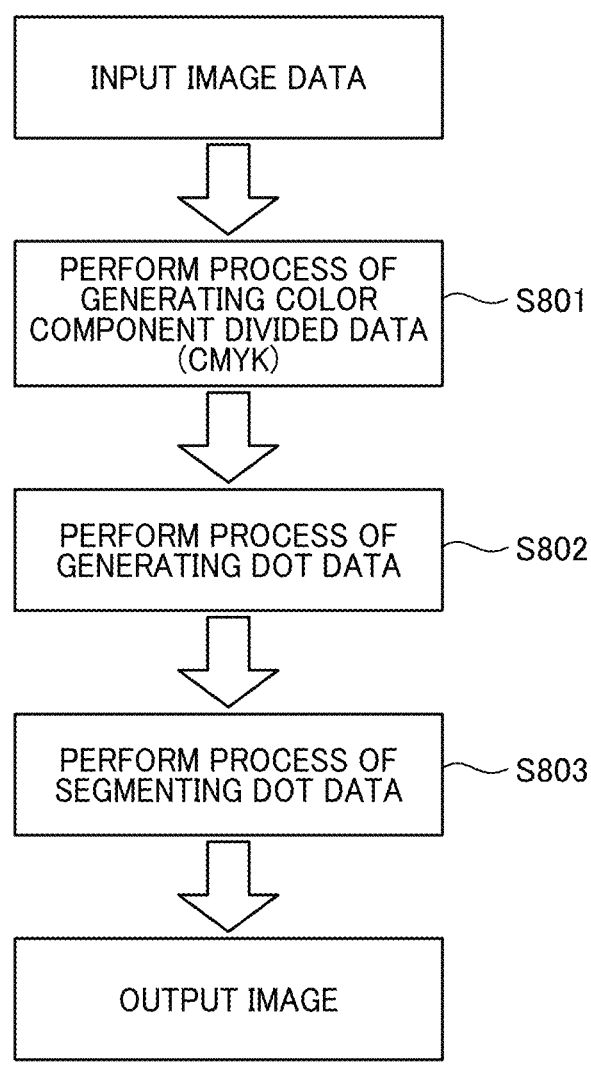
FIG. 8 is a flowchart illustrating an example of a flow of the multi-scan printing process in the inkjet recording apparatus according to a present embodiment.

Next, an example of a flow of a multi-scan printing process in the inkjet recording apparatus 10 according to this embodiment will be described with reference to FIG. 8. FIG. 8 is a flowchart illustrating an example of a flow of the multi-scan printing process in the inkjet recording apparatus according to this embodiment.

When image data to be printed is input, the color component divided data generation unit 511 generates color component divided data for each color of ink mounted on the inkjet recording apparatus 10 from the input image data (step S801). For example, in a case where the inkjet recording apparatus 10 performs printing using CMYK inks, the color component divided data generation unit 511 generates color component divided data of each color of CMYK for the input image data.

Next, the dot data generation processing unit 512 generates dot data by applying a dot data generation mask to the color component divided data of each color generated by the color component divided data generation unit 511 (step S802). Here, the dot data generation mask is, for example, a dither mask used for halftone processing and in which a threshold value is set.

Next, the dot data segmentation processing unit 513 applies a segmentation mask to the dot data generated by the dot data generation processing unit 512 to generate scan data (step S803). That is, for each dot of the dot data, the dot data segmentation processing unit 513 determines to use which of the nozzles 221a and 222a to form the dot for each scan in the main scanning direction of the recording head 22.

Then, the head driving controller 61 transfers the generated scan data to a driving circuit inside the recording head 22 and executes printing of an image on the medium 100 according to the scan data.

Figure 9:
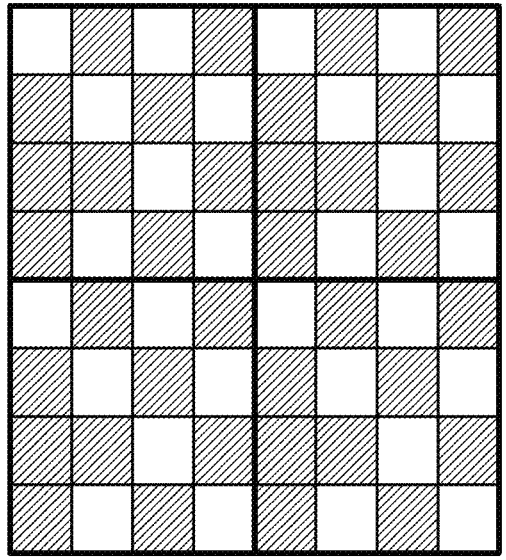
FIG. 9 is a diagram for describing an example of a dot data generation process in the inkjet recording apparatus according to a present embodiment.

Next, an example of a dot data generation process in the inkjet recording apparatus 10 according to this embodiment will be described with reference to FIG. 9. FIG. 9 is a diagram for describing an example of a dot data generation process in the inkjet recording apparatus according to this embodiment. In the following description, a process of generating dot data from color component divided data of one color will be described, but for other colors, dot data is similarly generated from color component divided data.

The color component divided data is grayscale data with a gradation from 0 to 255 in which one pixel is represented by 8 bits. As illustrated in FIG. 9, the dot data generation processing unit 512 generates dot data from color component divided data in which each pixel is represented by a single gradation (for example, 128-gradation) using a dot data generation mask. For example, in the dot data generation processing unit 512, the process of generating dot data includes dithering, and a threshold set for each pixel in the dot data generation mask is compared with the gradation of each pixel of the color component divided data. Then, the dot data generation processing unit 512 generates dot data by arranging dots into pixels exceeding the threshold set for the dot data generation mask among the pixels in the color component divided data.

In this embodiment, the dot data generation processing unit 512 generates binary dot data indicating the presence or absence of dots from the color component divided data, but it is also possible to generate multi-valued dot data. In a case where single gradation dot data (binary dot data) is generated from color component divided data, the dot data repeats the same dot pattern (generated dot pattern) at the same cycle as the dot generation mask as illustrated in FIG. 9.

Figure 10:
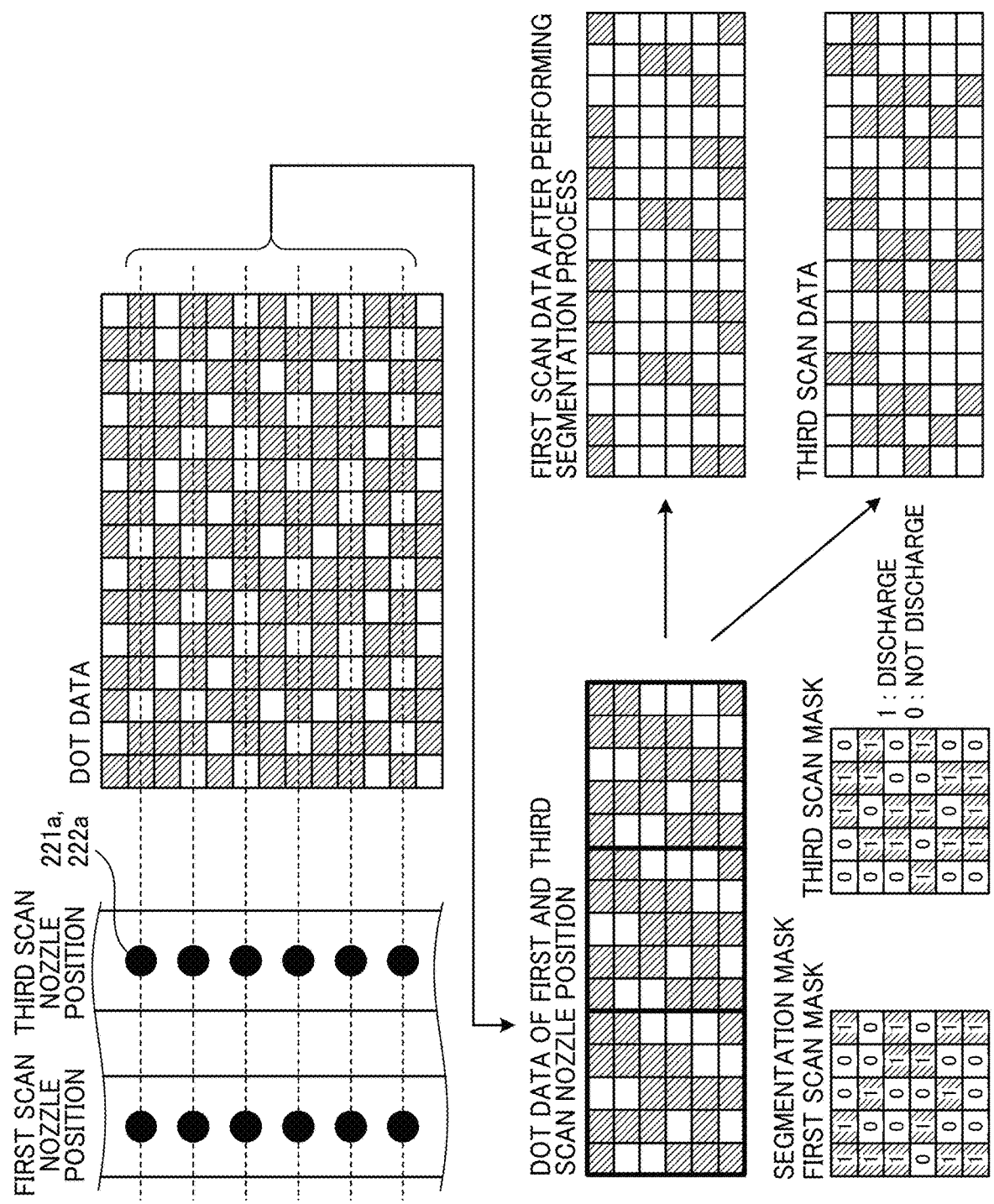
FIG. 10 is a diagram for describing an example of a scan data generation process by the inkjet recording apparatus according to a present embodiment.

Next, an example of a scan data generation process by the inkjet recording apparatus 10 according to this embodiment will be described with reference to FIG. 10. FIG. 10 is a diagram for describing an example of a scan data generation process by the inkjet recording apparatus according to this embodiment. In the following description, while a process of generating scan data of the first and third scans of the recording head 22 in a case where multi-scanning is performed in 2-pass ½ interlace will be described, scan data of the second and fourth scans are similarly generated.

As illustrated in FIG. 10, the dot data segmentation processing unit 513 first extracts pixels present at positions that are scanned by the nozzles 221a and 222a in the first and third scans of the recording head 22 (dot data of first and third scan nozzle position) from the dot data generated by the dot data generation processing unit 512. Specifically, broken lines in FIG. 10 indicate scanning positions at which the nozzles 221a and 222a perform scanning in the first and third scans, and the dot data segmentation processing unit 513 extracts pixels (dot data of first and third scan nozzle position) present at the scanning positions.

Next, the dot data segmentation processing unit 513 generates scan data of each of the first scan and the third scan (first scan data and third scan data) by performing a mask process on the extracted pixels using a segmentation mask (first scan mask and third scan mask). For example, as indicated by reference numeral 1001 in FIG. 10, the dot data segmentation processing unit 513 generates scan data for the dot data of the first and third scans by the segmentation masks of the first and third scans each. At that time, the dot data segmentation processing unit 513 generates scan data indicating that the liquid is to be discharged to a pixel corresponding to "1" of the segmentation mask and that the liquid is not to be discharged to a pixel corresponding to "0" of the segmentation mask among the pixels of the dot data. Here, the segmentation mask is provided for each scan of the recording head 22 and indicates a dot arrangement position that is a position of a pixel to which the liquid is discharged from the nozzles 221a and 222a in the scan. For example, as illustrated in FIG. 10, the segmentation mask is binary data indicating whether or not to discharge the liquid from the nozzles 221a and 222a for each dot.

In a case where multi-scanning is performed in 2-pass ½ interlace, the segmentation masks used to generate scan data in which the positions of the nozzles 221a and 222a in the sub-scanning direction overlap each other are in a complementary relationship. Therefore, the dot data segmentation processing unit 513 can decompose the dot data into the scan data corresponding to the number of scans of the recording head 22 by executing the mask processing on the dot data using the segmentation mask having the complementary relationship.

Figure 11:
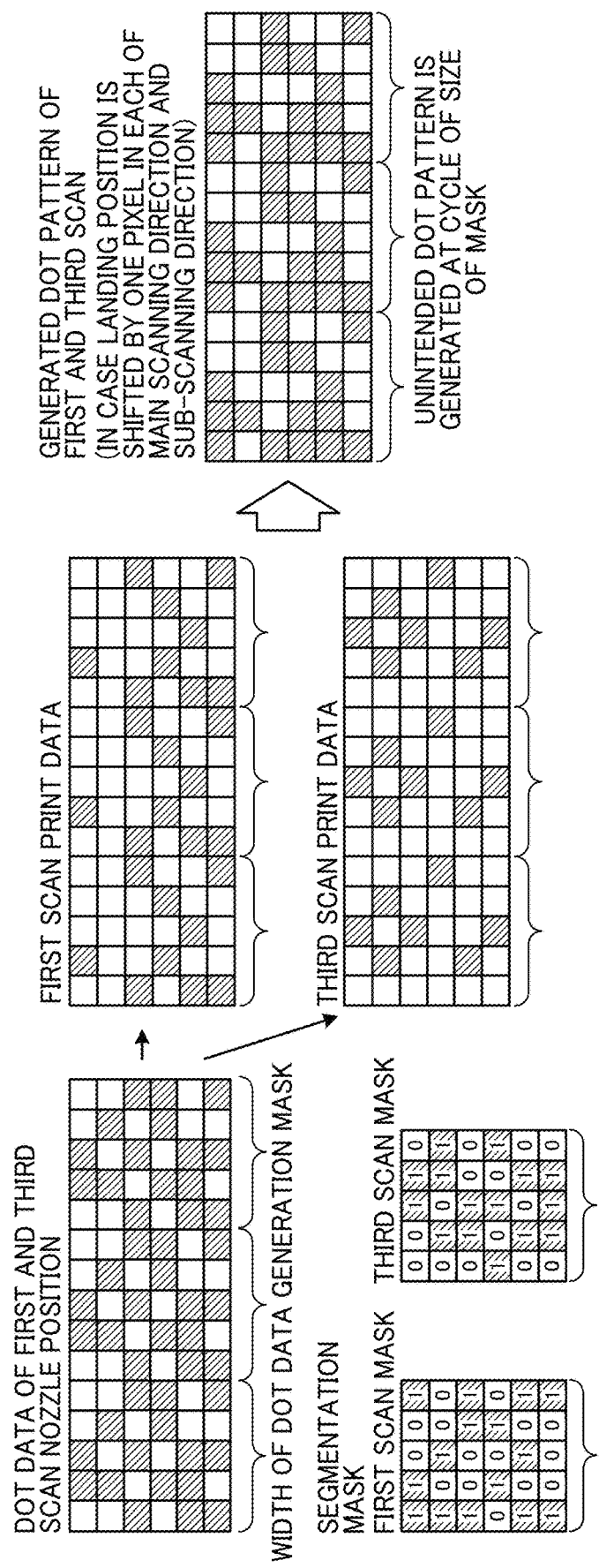
FIG. 11 is a diagram for describing an example of a scan data generation process in a conventional inkjet recording apparatus.

Next, an example of a scan data generation process in a conventional inkjet recording apparatus will be described with reference to FIG. 11. FIG. 11 is a diagram for describing an example of a scan data generation process in a conventional inkjet recording apparatus. In the following description, while a process of generating scan data of the first and third scans of the recording head 22 in a case where multi-scanning is performed in 2-pass ½ interlace will be described, scan data of the second and fourth scans are similarly generated.

When the color component divided data is a uniform color, the dot data generated from the color component divided data has the same dot pattern repeated with the width of the dot data generation mask. Furthermore, in a case where the widths of the dot generation mask and the segmentation mask in the main scanning direction are the same, as illustrated in FIG. 11, the scan data also has the same dot pattern repeated with the width of the dot data generation mask. In this case, when deviation occurs in the actual landing position of the liquid on the medium 100, an unintended pattern appears in the image formed on the medium 100, which causes deterioration in image quality.

Specifically, as illustrated in FIG. 11, in a case where the dot data of the first and third scans (dot data of first and third scan nozzle position) are formed on the medium 100 so as to be shifted by one pixel in each of the main scanning direction and the sub-scanning direction, a dot pattern different from the dot data before the mask processing is performed by the segmentation mask (generated dot pattern of first and third scan) is repeated. For example, in a case where the resolution of the image formed by the recording head 22 is 600 dpi, and the widths of the dot data generation mask and the segmentation mask in the main scanning direction are 256 px, a repeated dot pattern is generated at a cycle of 256*25.4/600=10.83 mm. As a result, an unintended pattern is generated in a short cycle in the image to be printed on the medium 100, and the image quality deteriorates.

In this case, the cycle of the dot pattern generated in the image to be printed on the medium 100 can be lengthened by increasing the widths of the dot data generation mask and the segmentation mask in the main scanning direction. However, for example, in a case where the resolution in the main scanning direction is 600 dpi, a mask of 1000 mm/(25.4/600)=23622-pixel width is required in order to set the repeated dot pattern of the image to be printed on the medium 100 to 1 m or more, which is not realistic.

Therefore, in this embodiment, the dot data segmentation processing unit 513 applies a segmentation mask having a different width in the main scanning direction from the dot data generation mask to the dot data generated by the dot data generation processing unit 512 to generate scan data. As a result, a dot pattern of the scan data can be a random dot pattern. As a result, in a case where deviation of a landing point of liquid occurs when forming an image having a uniform color such as solid, it is possible to suppress occurrence of an unintended pattern periodically in the main scanning direction of the recording head 22.

Figure 12:
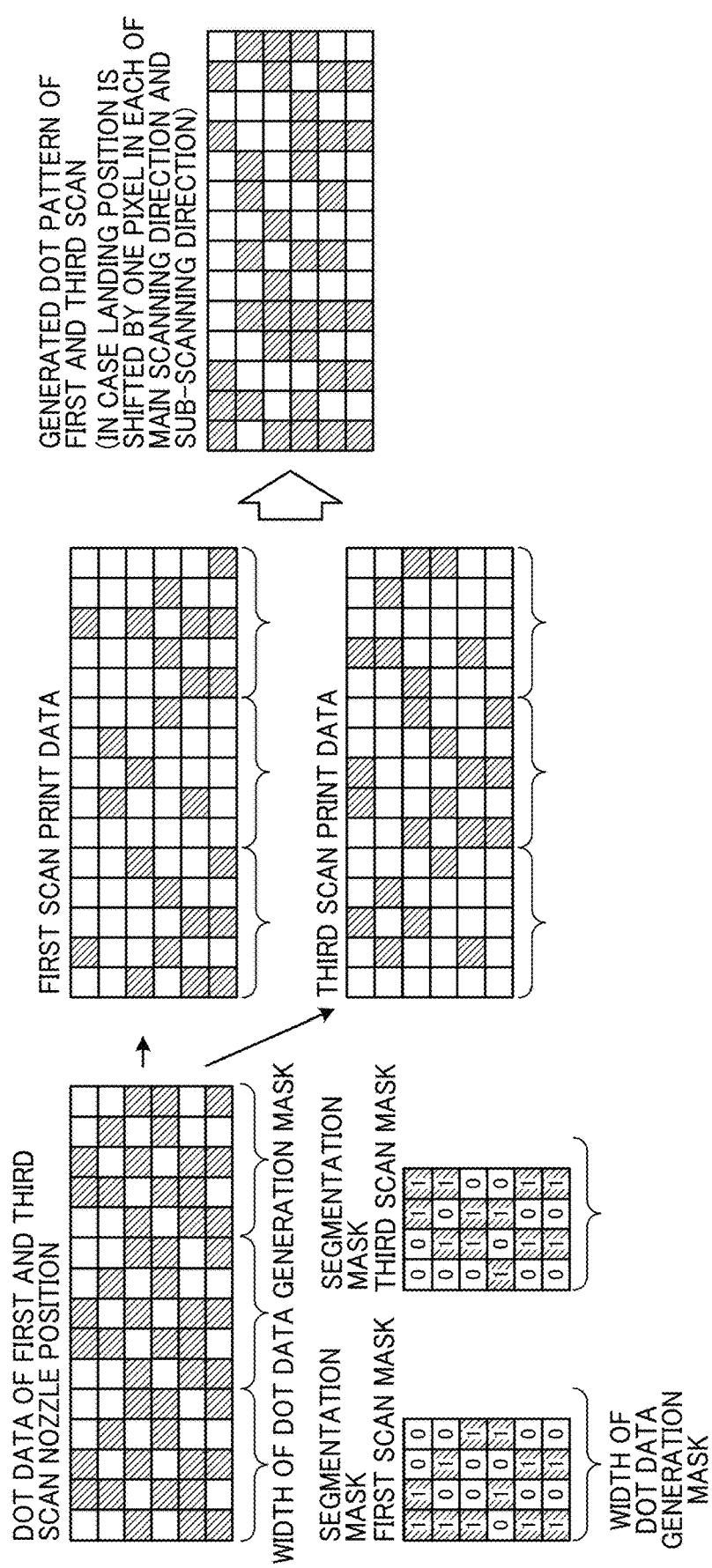
FIG. 12 is a diagram for describing an example of a scan data generation process in the inkjet recording apparatus according to a present embodiment.
Figure 13:
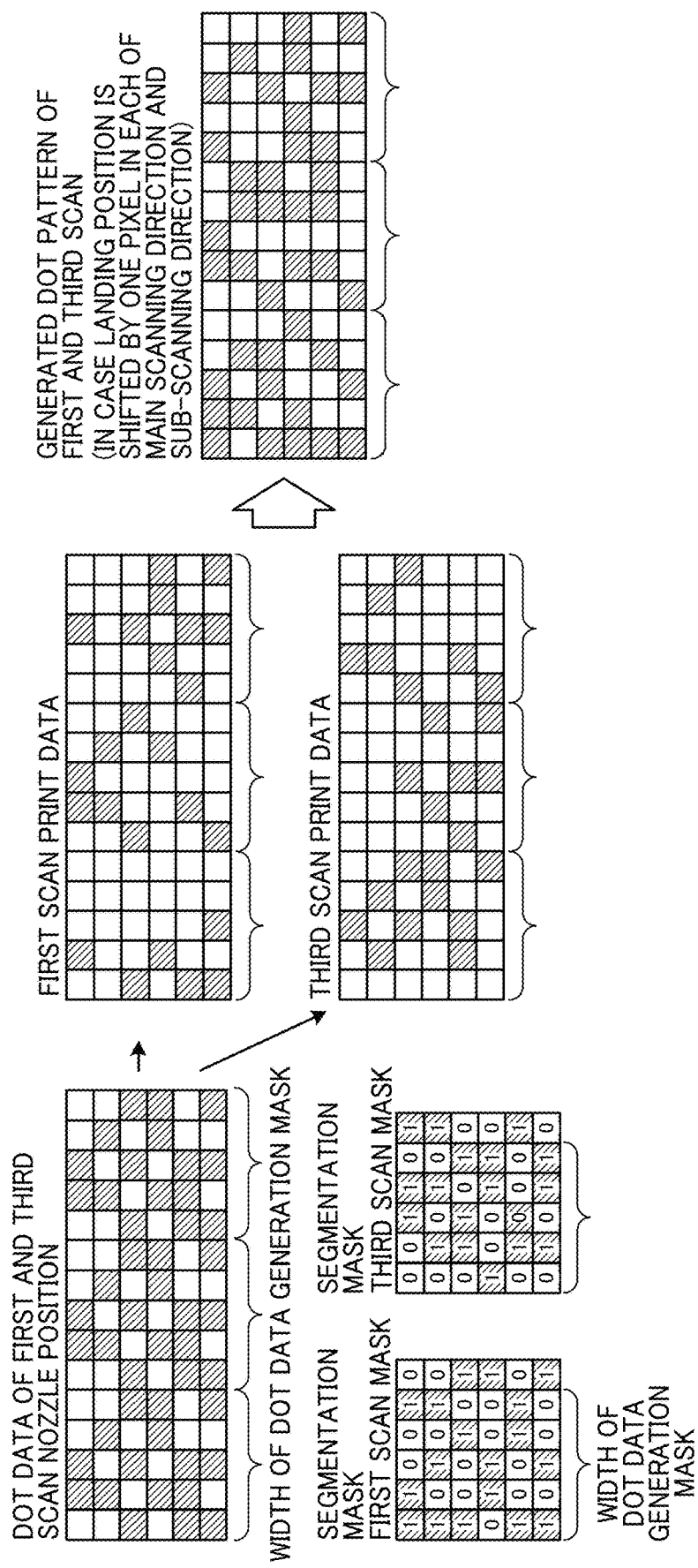
FIG. 13 is a diagram for describing an example of a scan data generation process in the inkjet recording apparatus according to a present embodiment.

Next, an example of a scan data generation process in the inkjet recording apparatus 10 according to this embodiment will be described with reference to FIGS. 12 and 13. FIGS. 12 and 13 are diagrams for describing an example of a scan data generation process in the inkjet recording apparatus according to this embodiment. In the following description, while a process of generating scan data of the first and third scans of the recording head 22 in a case where multi-scanning is performed in 2-pass ½ interlace will be described, scan data of the second and fourth scans are similarly generated.

In this embodiment, as described above, the dot data segmentation processing unit 513 applies a segmentation mask having a different width in the main scanning direction from the dot data generation mask to the dot data generated by the dot data generation processing unit 512 to generate scan data. For example, as illustrated in FIG. 12, the dot data segmentation processing unit 513 may generate scan data (print data of first and third scan) using a segmentation mask having a width (4 pixels) shorter than a width (5 pixels) in the main scanning direction of the dot data generation mask with respect to the dot data. Alternatively, for example, as illustrated in FIG. 13, the dot data segmentation processing unit 513 may generate scan data (print data of first and third scan) using a segmentation mask having a width (6 pixels) longer than a width (5 pixels) in the main scanning direction of the dot data generation mask with respect to the dot data.

To be exact, even if the widths of the dot data generation mask and the segmentation mask in the main scanning direction are made different from each other, a repeated dot pattern is generated in the image formed on the medium 100 at the least common multiple of the width of the dot data generation mask and the width of the segmentation mask. However, the least common multiple is made larger than the width that can be printed by the inkjet recording apparatus 10. That is, it is preferable that the product of the width in the main scanning direction of the dot data generation mask and the width in the main scanning direction of the segmentation mask is larger than the upper limit of the width in the main scanning direction of the image to be printed by the inkjet recording apparatus 10. In addition, it is preferable that the ratio between the width of the dot data generation mask in the main scanning direction and the width of the segmentation mask in the main scanning direction is not a natural number multiple.

As a result, it is possible to prevent repeated dot patterns from occurring in the image formed on the medium 100. In addition, if the scan data is a random pattern, even if the deviation of the landing position occurs in the actual printing operation, it is possible to prevent the generation of a periodic dot pattern that occurs when the width of the dot data generation mask is the same as the width of the segmentation mask.

For example, in a case where the resolution in the main scanning direction is 600 dpi, the width of the dot data generation mask in the main scanning direction is 256 pixels, and the width of the segmentation mask in the main scanning direction is 255 pixels, the least common multiple of the width of the dot data generation mask and the width of the segmentation mask in the main scanning direction is 652280. In a case where the upper limit of the width of the image that can be printed by the inkjet recording apparatus 10 is 65280*25.4/6002763 mm or less, a repeated dot pattern does not occur in the image to be printed on the medium 100. In addition, even in a wide-width inkjet recording apparatus, the cycle of the repeated dot pattern becomes long, so that deterioration in image quality can be reduced.

As described above, according to the inkjet recording apparatus 10 of this embodiment, the dot pattern of the scan data can be the random dot pattern. As a result, in a case where deviation of a landing point of liquid occurs when forming an image having a uniform color such as solid, it is possible to suppress occurrence of an unintended pattern periodically in the main scanning direction of the recording head 22.

Note that the program executed by the inkjet recording apparatus 10 of this embodiment is provided installed in the ROM 52 and the like in advance. The program executed by the inkjet recording apparatus 10 of this embodiment may be provided by being stored in a computer-readable recording medium, such as a compact disc read-only memory (CD-ROM), a flexible disk (FD), a compact disc recordable (CD-R), a digital versatile disc (DVD), and the like, in a file format installable or executable.

In addition, the program executed by the inkjet recording apparatus 10 of this embodiment may be stored in a computer connected to a network such as the Internet and the like, and the program may be provided by downloading the program via the network. Furthermore, it is possible to provide and distribute the program executed by the inkjet recording apparatus 10 of this embodiment via the network such as the Internet and the like.

The program executed by the inkjet recording apparatus 10 of the present embodiment includes a module structure including the functional units described above (color component divided data generation unit 511, dot data generation processing unit 512, and dot data segmentation processing unit 513). As for actual hardware, the CPU 51 (an example of a processor) reads the program from the ROM 52 described above and executes the program, and the functional units described above are loaded on a main storage device, and the color component divided data generation unit 511, the dot data generation processing unit 512, and the dot data segmentation processing unit 513 are generated on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus, comprising:
a color component divided data generation unit configured to generate color component divided data from image data;
a dot data generation processing unit configured to apply a dot data generation mask to the color component divided data to generate dot data; and
a dot data segmentation processing unit configured to apply a segmentation mask to the dot data to generate scan data,
a width of the segmentation mask in a main scanning direction being different from a width of the dot data generation mask in the main scanning direction.

2. The liquid discharge apparatus according to claim 1, wherein the dot data generation mask and the segmentation mask are masks having no periodicity.

3. The liquid discharge apparatus according to claim 1, wherein a ratio of the width of the dot data generation mask in the main scanning direction to the width of the segmentation mask in the main scanning direction is not a natural number multiple.

4. The liquid discharge apparatus according to claim 1, wherein a product of the width of the dot data generation mask in the main scanning direction and the width of the segmentation mask in the main scanning direction is larger than an upper limit of a width of an image to be formed by the liquid discharge apparatus in the main scanning direction.

5. A printing method to be executed in a liquid discharge apparatus, the method comprising:
generating color component divided data from image data;
applying a dot data generation mask to the color component divided data to generate dot data; and
applying a segmentation mask to the dot data to generate scan data, a width of the segmentation mask in a main scanning direction being different from a width of the dot data generation mask in the main scanning direction.

6. A liquid discharge apparatus, comprising processing circuitry configured to:
generate color component divided data from image data;
apply a dot data generation mask to the color component divided data to generate dot data; and
apply a segmentation mask to the dot data to generate scan data, a width of the segmentation mask in a main scanning direction being different from a width of the dot data generation mask in the main scanning direction.

* * * * *